United States Patent [19]

Yamamoto et al.

[11] Patent Number: 4,951,476
[45] Date of Patent: Aug. 28, 1990

[54] MODE SWITCHING ARRANGEMENT FOR AUTOMOTIVE AIR CONDITIONER

[75] Inventors: Akihiko Yamamoto, Zama; Naoharu Shibuya, Tokyo; Eiji Takahashi, Tokyo; Fumio Hagi, Tokyo, all of Japan

[73] Assignees: Calsonic Corporation, Tokyo; Nissan Motor Co., Ltd., Yokohama, both of Japan

[21] Appl. No.: 454,986

[22] Filed: Dec. 22, 1989

[30] Foreign Application Priority Data

Dec. 28, 1988 [JP] Japan .................................. 63-331065

[51] Int. Cl.[5] .......................... F25D 29/00; B60H 1/00
[52] U.S. Cl. ...................................... 62/163; 62/244; 165/16; 165/25; 165/42; 98/2.01; 98/2.09
[58] Field of Search ................. 62/161, 162, 163, 164, 62/244, 186; 98/2.01, 2.05, 2.08, 2.09, 2.11; 165/42, 43, 41, 16, 17, 24, 25

[56] References Cited

U.S. PATENT DOCUMENTS

| | | | |
|---|---|---|---|
| 4,418,744 | 12/1983 | Sidebottom | 62/164 X |
| 4,602,675 | 7/1986 | Kobayashi | 165/16 |
| 4,611,756 | 9/1986 | Ohashi | 98/2.01 X |
| 4,651,812 | 3/1987 | Biber | 165/25 |

*Primary Examiner*—Harry B. Tanner
*Attorney, Agent, or Firm*—Foley & Lardner, Schwartz, Jeffery, Schwaab, Mack, Blumenthal & Evans

[57] ABSTRACT

An automatic air conditioner is arranged to be responsive to external air temperature in a manner wherein, if the atutomatic mode is interrupted and manual control instigated and the external temperature is low (viz., below a predetermined level), the mode to which the system defaults upon the automatic - manual change, is set to defrost, defrost/foot modes or the like. On the other hand, if the external temperature is high (viz., above the predetermined level) the system is conditioned to default to the vent mode.

6 Claims, 4 Drawing Sheets

MODE SWITCHING ARRANGEMENT FOR AUTOMOTIVE AIR CONDITIONER

BACKGROUND OF THE INVENTION

1. Field of the Invention

The present invention relates to an automatic automotive air conditioner and more specifically to a mode switching arrangement for such an air conditioner.

2. Description of the Prior Art

In order to reduce driver distraction and to improve driving safety, it is has been proposed to use automatic air conditioners in automotive vehicles. These devices are arranged so as to only require the desired temperature to inputted. Once provided with this data input, these automatic type of air conditioners are capable of automatically controlling the temperature to which the conditioned air is adjusted, the ON/OFF control of the compressor, the setting of the doors which control the vent mode, the internal air temperature selection, the amount of air driven by the fan, etc., without further intervention each time the engine ignition switch is closed.

An example of such an arrangement is disclosed in Nissan Service Manual No. 578 which was published in June of 1987. This arrangement includes a number of different sensors which are arranged to sense the internal and external air temperatures, the heating effect of external sunshine entering the vehicle cabin, and like. These sensors enable the various decisions which must be made in order to achieve the required control.

Under normal conditions, the device is controlled by a program which takes the data input from the above mentioned sensors and decides the degree to which the air being conditioned should be heated or cooled, switches the compressor on and off, determines the setting of the vent doors and the amount of air flow that is induced by the fan.

In the case that a non-automatic or manual mode is required, the vent control button (see FIG. 1) is pressed (once). In response to this, the automatic mode is cancelled and the air conditioner is conditioned to produce a manual mode the initial setting of which is the vent mode. It will be noted that irrespective of the mode that would be induced under automatic control the system always defaults to the vent mode upon the manual mode selection. This feature has been provided in order to enable the occupants to selectively induce very rapid heating and cooling of the cabin.

In the event that the instant mode (i.e. vent mode) is not required or desired, it is possible to select another simply by pressing the vent button again. In the above example, the second depression of the vent button induces the bilevel mode, while the third induces a defrost/foot mode and the fourth induces the defrost mode. A fifth depression toggles back to the vent mode.

However, the order in which the modes are toggled between, is fixed and does not take into account the external air temperature. Accordingly, in the event that the external air temperature is low, it is very likely that the the inner surface of the windshield will undergo rapid fogging or misting. Nevertheless, the air conditioner is arranged to default to the vent mode and the possibility that this fogging will induce reduction in visibility and a consequent loss of driving safety, comes into existence.

Further, if the engine is not yet warmed-up a draft of uncomfortably cold air is apt to be directed against the torso(s) of the passenger(s) seated in the front of the vehicle.

SUMMARY OF THE INVENTION

It is an object of the present invention to provide an improved air conditioning arrangement which allows the selection of a manual mode, and which is responsive to the external air temperature in a manner which selectively varies the default setting of the manual mode and which obviates the above mentioned drawbacks.

In brief, the above object is achieved by an automatic air conditioner which is responsive to external air temperature and which is arranged so that, when the automatic mode is manually interrupted and manual control instigated, if the external temperature is low (viz.,below a predetermined level), the mode to which the system defaults upon an automatic—manual change, is set to defrost, defrost/foot modes or the like. On the other hand, if the external temperature is high (viz., above the predetermined level), the system is conditioned to default to the vent mode or similar mode which will rapidly induce comfortably cool conditions within the vehicle cabin.

More specifically, a first aspect of the present invention is deemed to comprise an automatic automotive air conditioner which features: means for switching the mode of operation from automatic to manual in responsive a manually generated input; an external temperature sensing means; means for setting the initial mode to a first predetermined mode when said external temperature is below a predetermined value and said mode switching means indicates that an automatic operation has been interrupted and manual operation is selected, setting the initial mode to a second predetermined mode when the external temperature is above said predetermined value and said mode switching means indicates that automatic operation has been interrupted and manual operation is selected; and changing the mode from the initial one to another each time a signal is issued by the mode switching means.

A second aspect of the invention is deemed to comprise a method of operating an automatic automotive air conditioner which features the steps of: setting the air conditioner to default to automatic operation when the conditioner is initially started; using a first manually induced signal to interrupt the automatic control and permit manual control of the air conditioner; sensing the external air temperature; inducing the initial mode of the manual control to default to a first predetermined mode when the external air temperature is below a predetermined level and the automatic control is interrupted; inducing the initial mode of the manual control to default to a second predetermined mode when the external air temperature is above the predetermined level and the automatic control is interrupted; and changing the default mode to a different one in response to a second manually induced signal.

A third aspect of the present invention is deemed to comprise a an automatic automotive air conditioner which features: means for setting the air conditioner to default to automatic control when the air conditioner is initially started; means for using a first manually induced signal to interrupt the automatic control and permit manual control of the air conditioner; means for sensing the external air temperature; means for inducing the initial mode of the manual operation to default to a first predetermined mode when the external air temperature is below a predetermined level and the automatic control is interrupted; means for inducing the initial mode of the manual operation to default to a second predetermined mode when the external air temperature is above the predetermined level and the automatic control is interrupted; and means for changing the default mode to a different one in response to a second manually induced signal.

DETAILED DESCRIPTION OF THE PREFERRED EMBODIMENT

Figure 1:
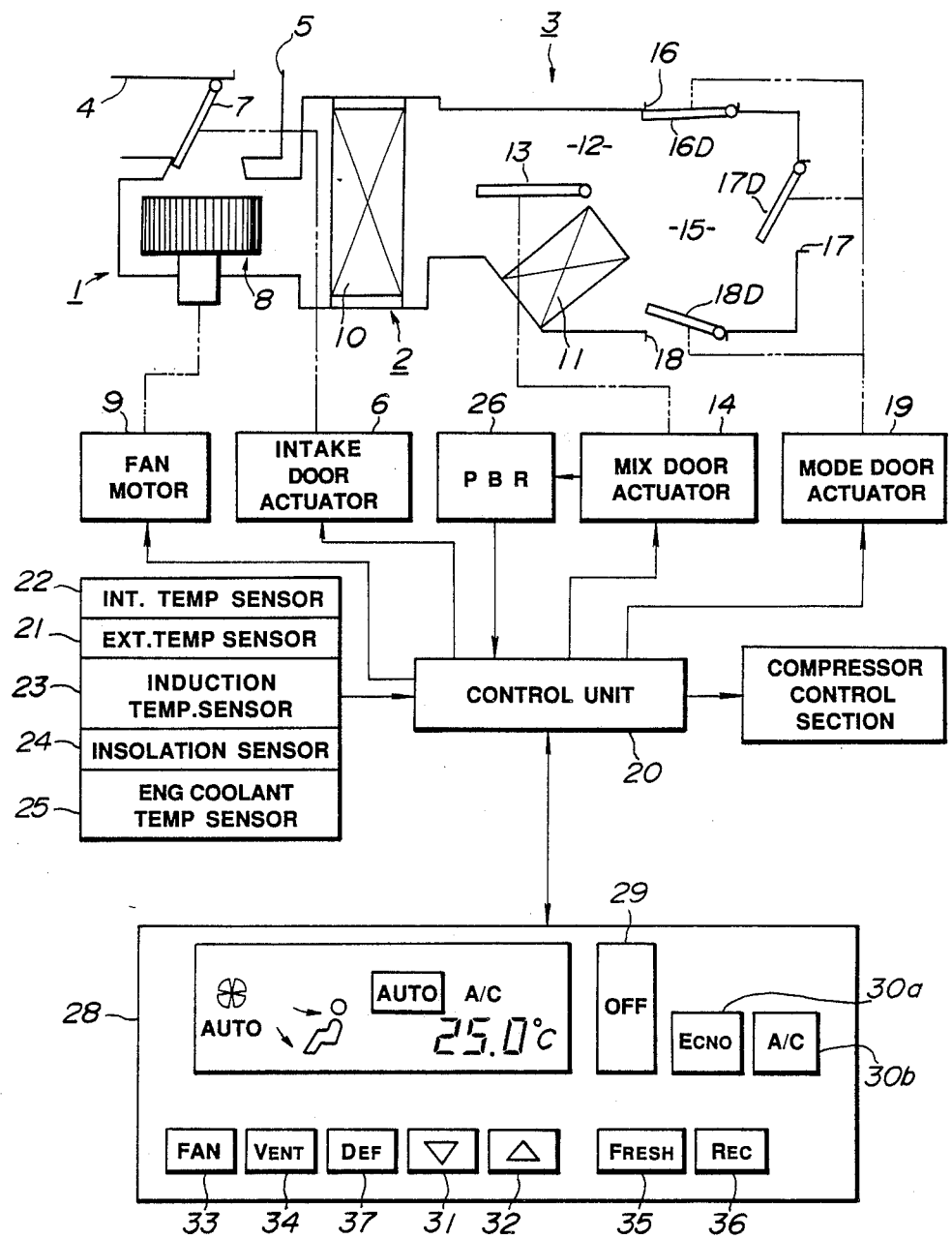
FIG. 1 is a schematic block diagram showing an example of an air conditioner arrangement to which the instant invention is applicable.

FIG. 1 shows an example of an air conditioning arrangement to which the present invention can be applied. As shown, the induction unit 1 of the air conditioner generally comprises a cooler unit 2 and a heater unit 3.

The intake unit 1 includes an inlet 4 via which air from the vehicle cabin can be inducted for recirculation and an inlet 5 via which external or "fresh" air can be inducted. An intake door actuator 6 is operatively connected with an intake door 7. This door 7 is pivotally mounted in a manner which can selectively close off one of the ducts 4 and 5.

A fan 8 is operatively connected with a fan motor 9 and arranged to force the fresh or recirculated air toward the cooler and heating units 2, 3.

The cooler unit 2 includes an evaporator 10 which forms part of a refrigeration circuit (not shown), while the heater unit 3 includes a heater core 11 which is located in a transfer passage 12 downstream of the evaporator. A mix door 13 is arranged with the heater core 11 and operatively connected with a mix door actuator 14. The mix door 13 is arranged to control the fraction of air which flows through the transfer passage 12 which passes the heater core 11.

A mixing or blending chamber 15 is defined in the intake unit 1 downstream of the heater core 11 and the mix door 13 and arranged to blend the fraction of the air which has passed through the heater core 11 with the fraction which has not.

A defrost outlet 16, a vent outlet 17 and a foot outlet 18 which open into the blending chamber 15 are arranged in the illustrated manner. These outlets or establish fluid communication between the blending chamber 15 and the respective duct or conduits which convey the conditioned air to predetermined locations in the vehicle cabin. In this arrangement to the defrost outlet is arranged to direct conditioned air toward the windshield while the other two outlets are respectively arranged to convey air toward the feet and/or floor of the vehicle cabin.

The outlets 16, 17 and 18 are respectively controlled by doors 16D, 17D and 18D. These doors are operatively connected by a non-illustrated mechanism with a mode door actuator 19. This mechanism includes a linkage which enables the doors to be selectively opened and set at desired opening degrees in a manner which permits any one of four different modes to be established. More specifically, the mechanism is arranged to permit: only the vent door 17D to be opened to establish a vent mode; the vent door 17D and the foot door 18D to be each half opened to establish a bilevel mode; the defrost door 16D and the foot door 18D to each half opened to establish a defrost/foot mode; and the defrost door 16D only to opened to establish a defrost mode.

It should be noted that although the above described air conditioning arrangement is capable of producing four different modes, the present invention is not limited to such an arrangement and can be applied to conditioning devices having a different number of modes. By way of example only, the invention can be applied to arrangements which also include side vent modes and the like.

A control unit 20 is operatively connected with the fan motor 9, the intake door actuator 6, the mix door actuator 14 and the mode door actuator 19 and arranged to issue control signals thereto.

This control unit 20 is further arranged to receive data input from a plurality of sensors, including an external temperature sensor 21 (which senses the air temperature outside of the vehicle cabin); a internal temperature sensor 22 (which senses the temperature of the air in the vehicle cabin); a induction temperature sensor 23 which senses the temperature of air immediately upstream of the evaporator 10; an insolation sensor 24; an engine coolant temperature sensor 25 which senses the temperature of the water flowing through the heater core 11; and a PRB type sensor which is arranged to sense the opening degree of the mix door 13.

Figure 2:
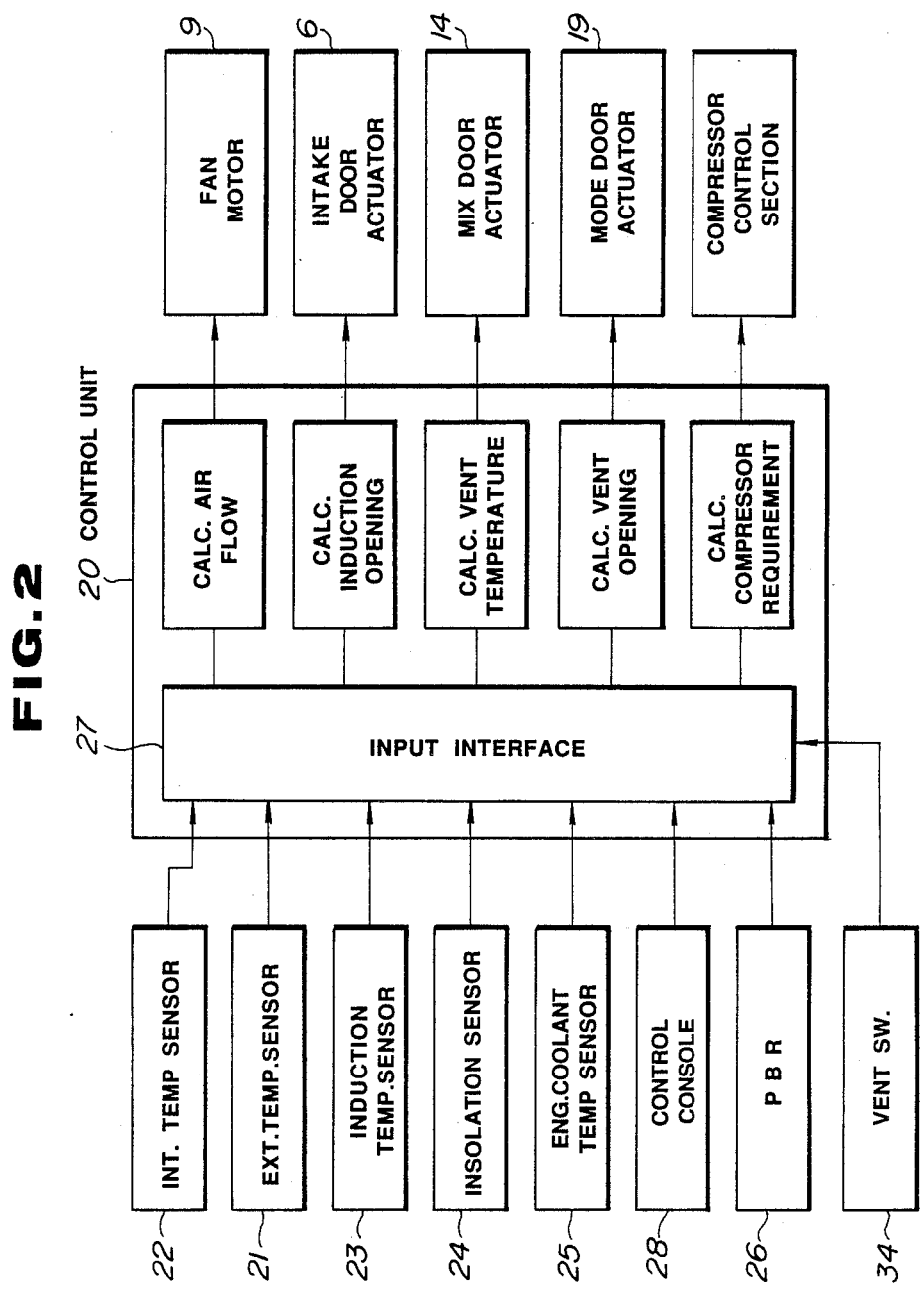
FIG. 2 is a block diagram showing an example of sensor and actuator arrangements which are interconnected by a control circuit which is arranged to implemented control according to the present invention.

As shown in FIG. 2 the inputs from the sensors 21-25 are fed to input interface 27 along with an input from the control console 28. In this instance the inputs from the console 28 are produced by: an OFF control switch 29 which is used to turn fan and compressor off; A/C and economy switches 30a, 30b which cancel the manual mode, respectively start and stop the operation of the compressor and induce automatic operation of the air conditioner; temperature increase and decrease switches 31, 32 which are used to modify the setting of the desired temperature value; a fan level control switch 33 which is used to enable manual setting of the fan speed; a vent mode selection switch 34 which is used to initiate the manual mode; a fresh selection switch 35 which is used to set the intake door 7 to a position to a position wherein fresh air is inducted from outside of the vehicle through duct 5; a recirculation switch 36 which is used to set the intake to prevent the induction of external air and induce the air in the cabin to be inducted into the intake unit via duct 4; and a defrost switch 37 which is used to induce the exclusive opening of the defrost door 16D and enable the selection of the defrost mode in the event that the windshield suddenly becomes misted or fogged and it is desired to clear the same in the interest of driving safety.

In this arrangement the vent switch 34 can also be used in the instant embodiment to enable the defrost mode to be induced as will become more apparent hereinlater.

When air conditioner is operating in the automatic mode and the vent switch 34 is pressed once, the automatic mode is interrupted and manual setting enabled.

In accordance with the present invention, the initial or default mode which is induced upon the manual control being induced, is determined in accordance with the input from the external temperature sensor 21.

That is to say, in view of the fact that when the external temperature is low, it is very likely that the windshield will fog rapidly particularly if the heater core 11 has not yet been heated to its normal operating temperature. Further, the torsos of the front passenger or passengers are apt to be exposed to an uncomfortable cold draft of air. Accordingly, the initial or default mode of the manual mode is selected to be the defrost/foot mode wherein air is directed against the inner surface of the windshield and toward the feet of the front passengers. Alternatively, if the air conditioner to which the invention is applied cannot be set to produce the combined defrost/foot mode, then the defrost mode can be used as the default. Alternatively, the foot mode can be selected is so desired.

On the other hand, if the external temperature is high and the vent mode switch is pressed once, in order to cool the entire vehicle cabin as rapidly as possible the default is set to the vent mode. This selection also ensures that the draft of cooling air is initially directed toward the passengers and thus tend to induce the most comfortable conditions as soon as possible.

Figure 3:
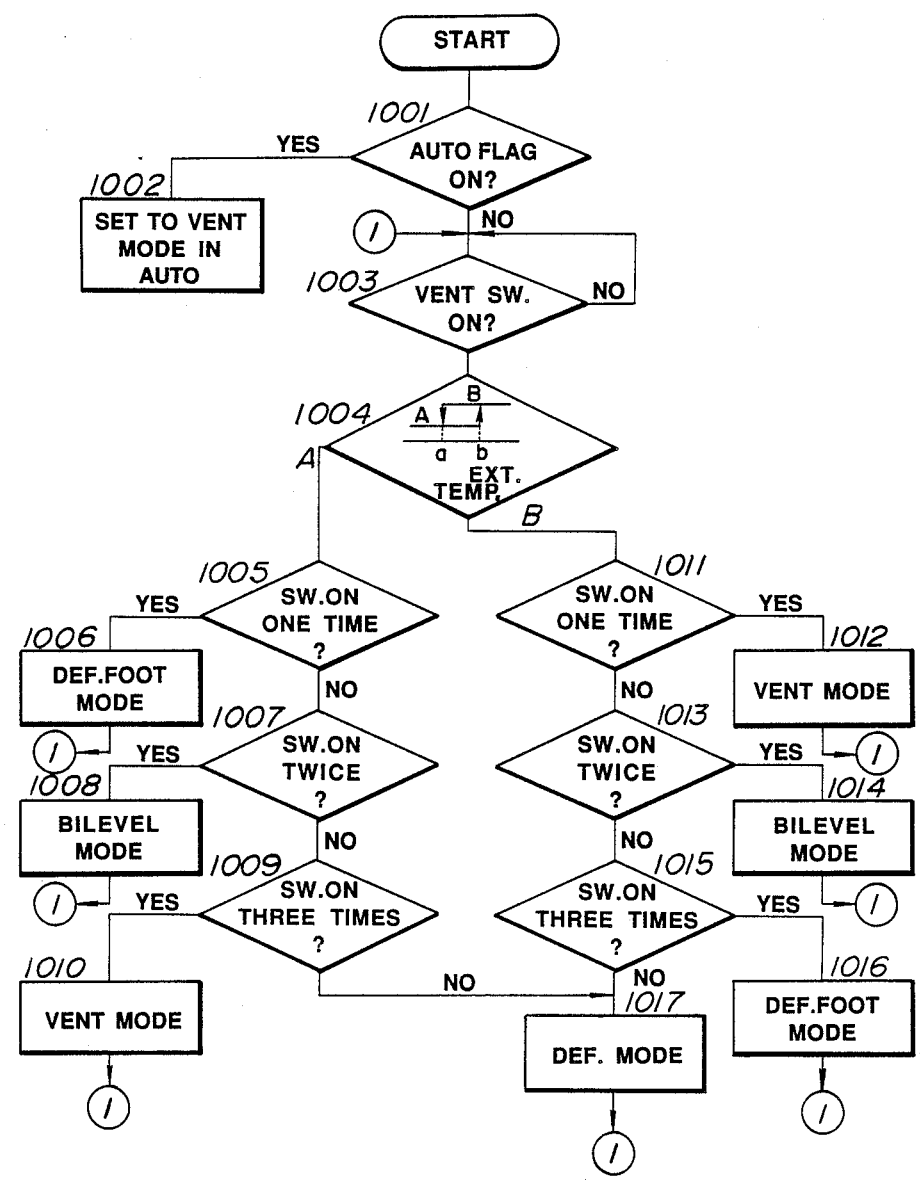
FIG. 3 is a flow chart showing the steps which characterize the operation to an embodiment of the present invention.
Figure 4:
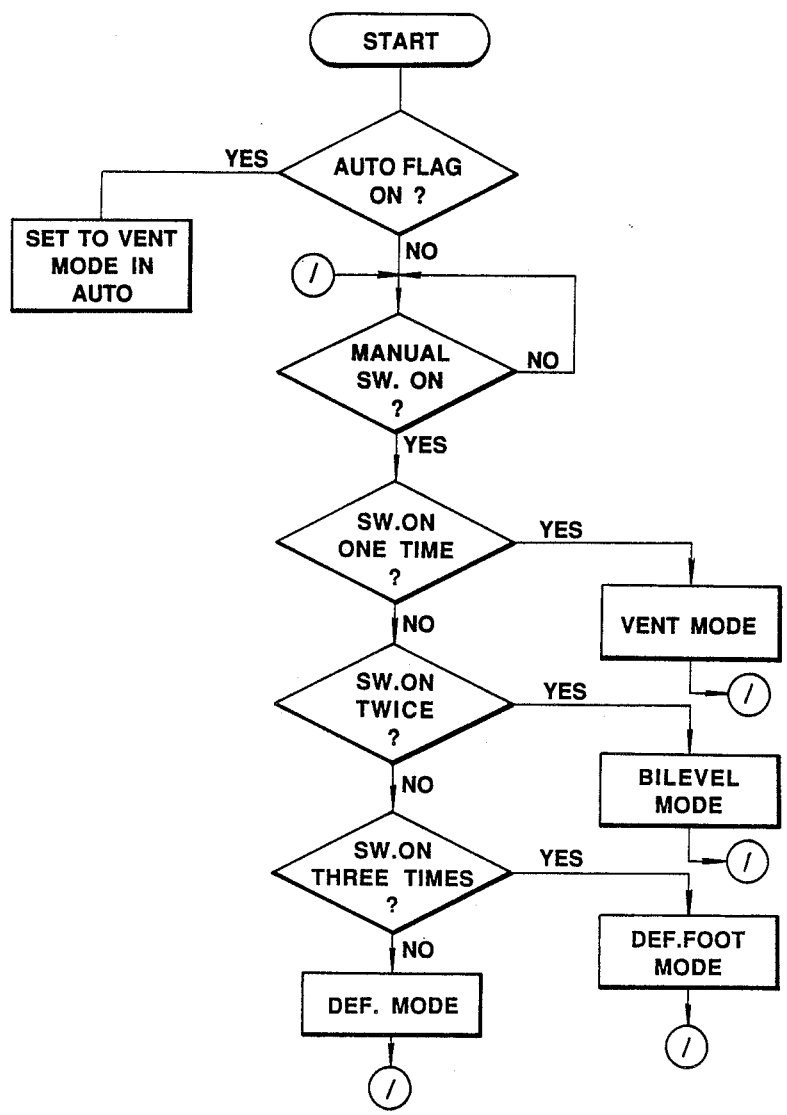
FIG. 4 is a flow chart showing the operations according to the prior art discussed in the opening paragraphs of the instant disclosure.

The manner in which the default is switched in accordance with the present invention will become more clearly appreciated as the description of the flow chart shown in FIG. 3 proceeds.

As will be noted, the first step 1001 of the routine depicted in this flow chart is such as to determine the status of an auto flag. This flag is set by the closure of the ignition switch or the depression of either of switches 30a or 30b and if cleared by a depression of the vent switch 34.

If the outcome of step 1001 is such as to indicated that the auto flag is 1 (viz., ON) the routine flows across to step 1002 wherein normal automatic control routines are run.

However, if the flag is found to be 0 (i.e. OFF) which is indicative that the automatic control mode has been cancelled, the routine flows to step 1003 wherein the routine waits and determines if the vent switch 34 is depressed. By way of example only this step is arranged to count the number of depressions and to develop a switch operation value. In this case the maximum operation number is limited to 4. Viz., if the switch 34 is depressed five times the control number toggles back to 1.

Following this, at step 1004 the input of the external temperature sensor 21 is compared with a predetermined value (T° C). If the outcome of the comparison indicates that the external temperature is lower than T° C. then the routine flows to step 1004 while in the event that it is higher then routine flows to step 1011. It will be noted that in order to smooth control and to prevent hunting, a 1-2 degree hysteresis loop (by way of example) is established and induces the situation wherein the control follows trace A in the case the temperature increases from the low side and trace B in the case the temperature decreases from the high side.

In step 1005 the number of times the vent switch has been depressed is checked. In the event that the switch 34 has been depressed only once, the routine flows to step 1006 wherein commands which induce the defrost/foot mode are issued and the routine recycles. However, if the switch has been depressed more than once, the routine flows to step 1007. If the number of depressions is found to be 2 in step 1007, the routine flows to step 1008 wherein command which induce the bilevel mode are issued. In the event that the depression count is 3 the routine flows via step 1009 to 1010 and induces the vent mode. However, if the count is at the maximum of 4, then the routine flows to step 1017 wherein the defrost mode is induced.

On the other hand, if, the outcome of the comparison in step 1004 is such as to cause the routine to flow to step 1011 then, depending on the number of depressions (viz., 1-4) one of the vent mode, the bilevel mode, the defrost/foot mode and the defrost mode is selectively induced.

In brief, steps 1005 to 1010 and 1017 are such as to ensure that, if the external temperature is low, and the vent mode switch 34 is depressed only once, either one or both of detrimental windshield fogging and exposing passengers to cold drafts, tends to be minimized. Subsequent depressions enable the default mode to be switched to one of the bilevel, vent or defrost modes.

On the other hand, steps 1011 to 1017 are such as to ensure that when the external temperature is relatively high, the vent mode, which will most rapidly bring about the most desirably conditions in the vehicle cabin, is induced by the first depression of the vent switch 34.

What is claimed is:

1. In an automatic automotive air conditioner
means for switching the mode of operation from automatic to manual in responsive a manually generated input;
an external temperature sensing means;
means for setting the initial mode to a first predetermined mode when said external temperature is below a predetermined value and said mode switching means indicates that an automatic operation has been interrupted and manual operation is selected,
setting the initial mode to a second predetermined mode when the external temperature is above said predetermined value and said mode switching means indicates that automatic operation has been interrupted and manual operation is selected; and
changing the mode from the initial one to another each time a signal is issued by the mode switching means.

2. An automatic automotive air conditioner as claimed in claim 1 wherein said first predetermined mode is one wherein the air which is emitted from the air conditioner is directed against the inner surface of the windshield.

3. An automatic automotive air conditioner as claimed in claim 1 wherein said first predetermined mode is one wherein the air which is emitted from the air conditioner is in part directed against the inner surface of the windshield and in part directed toward the floor of the vehicle.

4. An automatic automotive air conditioner as claimed in claim 1 wherein the air conditioner is arranged to selectively produce a plurality of different modes, the sequence in which mode setting means changes the modes from the initial set on when the external temperature is below said predetermined value is at least in part, different from the sequence in which the modes setting means changes the modes when the external temperature is above said predetermined value.

5. In a method of operating an automatic automotive air conditioner the steps comprising:
    setting the air conditioner to default to automatic operation when the conditioner is initially started;
    using a first manually induced signal to interrupt the automatic control and permit manual control of the air conditioner;
    sensing the external air temperature;
    inducing the initial mode of the manual control to default to a first predetermined mode when the external air temperature is below a predetermined level and the automatic control is interrupted;
    inducing the initial mode of the manual control to default to a second predetermined mode when the external air temperature is above the predetermined level and the automatic control is interrupted; and
    changing the default mode to a different one in response to a second manually induced signal.

6. In an automatic automotive air conditioner:
    means for setting the air conditioner to default to automatic control when the air conditioner is initially started;
    means for using a first manually induced signal to interrupt the automatic control and permit manual control of the air conditioner;
    means for sensing the external air temperature;
    means for inducing the initial mode of the manual operation to default to a first predetermined mode when the external air temperature is below a predetermined level and the automatic control is interrupted;
    means for inducing the initial mode of the manual operation to default to a second predetermined mode when the external air temperature is above the predetermined level and the automatic control is interrupted; and
    means for changing the default mode to a different one in response to a second manually induced signal.

* * * * *